Oct. 30, 1962 C. S. GARSKI ETAL 3,061,285
FUEL SYSTEMS FOR INTERNAL COMBUSTION ENGINES
Filed June 15, 1959 3 Sheets-Sheet 1

INVENTORS
CHESTER S. GARSKI
BY CARLTON C. PHILLIPS
Whittemore, Hulbert
& Belknap ATTORNEY Oct. 30, 1962  C. S. GARSKI ETAL  3,061,285
FUEL SYSTEMS FOR INTERNAL COMBUSTION ENGINES
Filed June 15, 1959  3 Sheets-Sheet 3

INVENTORS
CHESTER S. GARSKI
CARLTON C. PHILLIPS
BY
*Whittemore, Hulbert*
*& Belknap*
ATTORNEYS

United States Patent Office 3,061,285
Patented Oct. 30, 1962

3,061,285
FUEL SYSTEMS FOR INTERNAL COMBUSTION ENGINES
Chester S. Garski, Detroit, and Carlton C. Phillips, Birmingham, Mich., assignors to Holley Carburetor Company, Van Dyke, Mich., a corporation of Michigan
Filed June 15, 1959, Ser. No. 820,343
23 Claims. (Cl. 261—23)

The present invention relates generally to fuel systems for internal combustion engines, and more specifically, to a carburetor and mounting structure therefor including means for supplying air for idle operation of the engine.

The usual carburetor of prior design delivers idle air to the engine intake manifold by means of a partially open throttle valve. This method of supplying air for idle engine operation has proved to be unsatisfactory, especially in those situations where the engine has not reached normal operating temperatures and the ambient temperature is low. When a carburetor of this prior design is idled in cold weather the moisture content of the air drawn around the "cracked" throttle frequently condenses and freezes adjacent to and on the upper surface and edges of the throttle valve due to the cooling effect of the air flowing past the throttle. The ice which is so formed may clog the idle fuel ports and cause engine stalling.

Various designs of idle air bypass means have been proposed in order to eliminate this icing. Some of these have been non-adjustable, constantly-open conduits which supply a quantity of air posterior to the throttle valve, while others have been of the adjustable variety. The constantly-open, non-adjustable bypass systems are not generally desirable because of possible variations in engine characteristics.

The adjustable systems heretofore proposed have not been used because of the complexity of the design (especially in the multi-barrel multi-stage carburetors) and the inaccessibility of the adjustment means. Almost all carburetors have air cleaners mounted thereon, and the air cleaners have become lower and larger in diameter as a result of increased air demands and automotive styling. This has required that the air cleaner be removed any time adjustments of the idle air bypass were desired.

Accordingly, it is an object of the present invention to provide adjustable means for supplying idle air to the engine, and more specifically, to provide readily accessible adjustment means for supplying idle air posterior to the carburetor throttle valve which may be adjusted without removing the air cleaner or other components of the carburetor.

It is a further object of the present invention to provide mounting means for attaching the carburetor to the intake manifold and for attaching the air cleaner to the carburetor, including separately releasable elements which provide for separation of the air cleaner from the carburetor and removal of the carburetor from the engine manifold as desired.

More specifically, it is an object of the present invention to provide a carburetor and air cleaner combination comprising an attachment stud having a threaded portion engageable in a tapped recess in an engine manifold to serve as the sole releasable connecting means for attaching the carburetor to the manifold, said stud having air passage means extending therethrough providing for flow of idle air, an adjusting valve in said passage, a tubular air cleaner attachment stud connected to said carburetor, and an opening extending through said stud affording access to said adjusting idle air valve.

Other objects and features of the invention will become apparent as the description proceeds, especially when taken in conjunction with the accompanying drawings, illustrating preferred embodiments of the invention, wherein.

Figure 1:
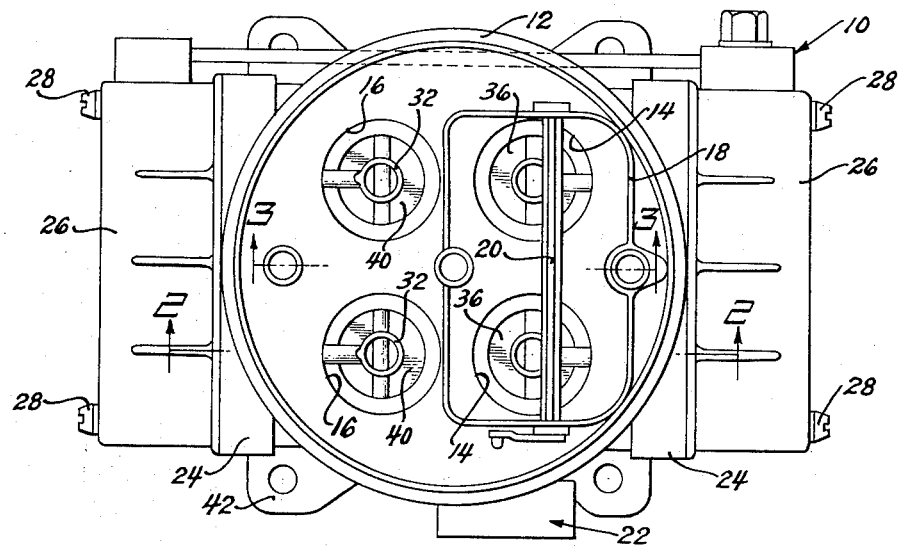
FIGURE 1 is a top plan view of a carburetor embodying the invention and having its air cleaner removed.
Figure 2:
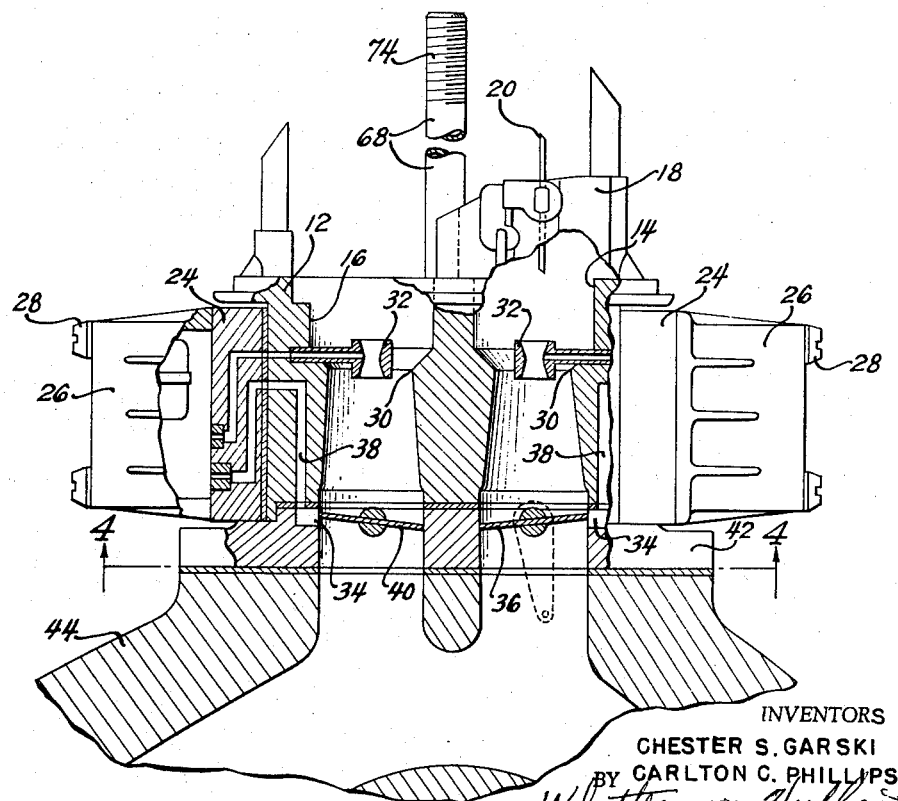
FIGURE 2 is a side elevational view of the carburetor illustrated in FIGURE 1, with portions thereof in cross-section taken substantially on the plane of line 2—2, FIGURE 1.

Referring now to the drawings, the carburetor indicated generally at 10 comprises a body 12 having primary and secondary induction passages 14 and 16 respectively, extending therethrough. The air intake 18 mounted on the body 12 has a choke valve 20 therein adapted to control the flow of air therethrough. A choke control device indicated generally at 22 is suitably connected to the choke valve in a manner well known in the art. In the particular carburetor illustrated fuel metering blocks 24 and fuel bowls 26 are sequentially secured to the body 12 by any suitable means such as screws 28.

The primary induction passages 14 are illustrated as containing venturis 30 and a main fuel nozzle 32 is located generally within the throat of each venturi. An idle fuel system is schematically illustrated by a port 34 discharging posterior to the throttle valve 36 and being in communication with the fuel bowl by means of suitable conduitry including passage 38. The secondary induction passages 16 have separate fuel metering systems, all elements therein which are the same as those provided within primary fuel passages 14 being identified by like reference characters. The idle throttle valve 40 however, is different from the primary throttle valve in that it may be controlled either manually in accordance with primary throttle position, or automatically in accordance with engine requirements.

The primary and secondary throttles 36 and 40 are illustrated as contained within a separate throttle body 42 which is secured to the carburetor body 12 by screws or the like (not shown). The entire carburetor assembly as so far described comprises the body 12, metering blocks 24, fuel bowls 26, and throttle body 42, and this assembly is secured as a unit to the engine intake manifold 44 by structure which will subsequently be described in detail.

Figure 3:
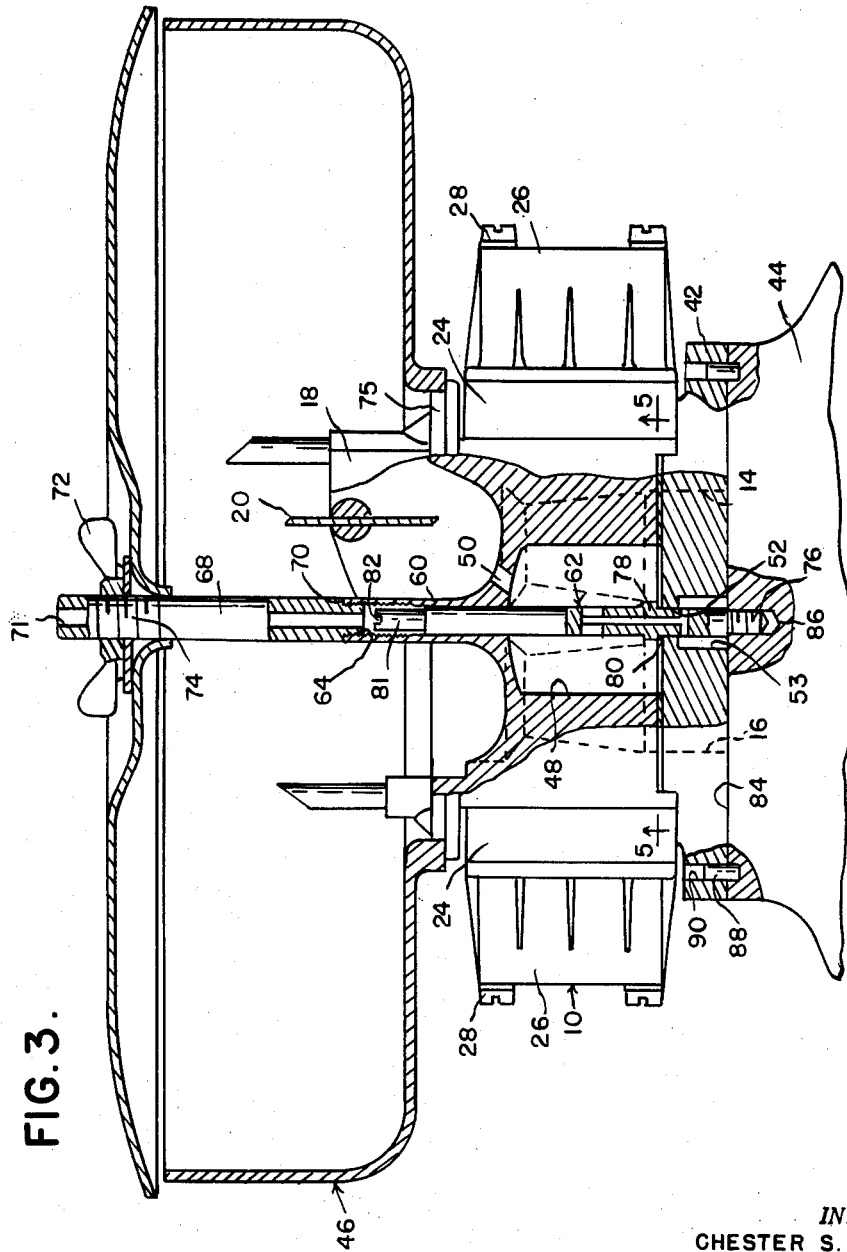
FIGURE 3 is a view similar to FIGURE 2 except that the air cleaner is shown in place and the section is taken substantially on the plane of line 3—3, FIGURE 1.
Figure 4:
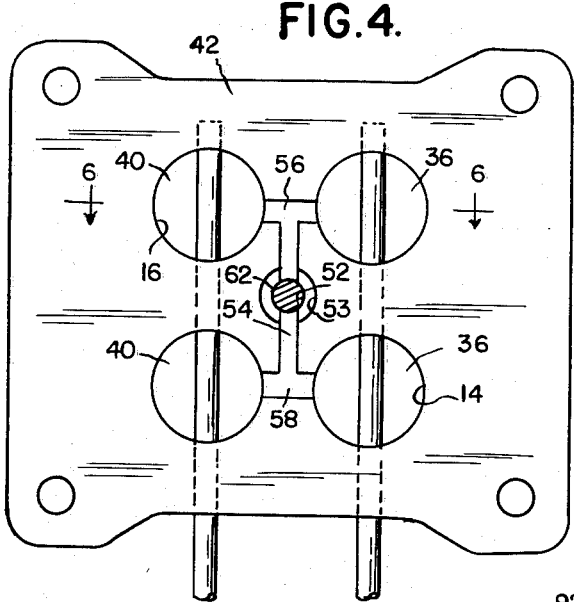
FIGURE 4 is a bottom plan view of the carburetor shown in FIGURE 1, as viewed on the plane of line 4—4, FIGURE 2.
Figure 5:
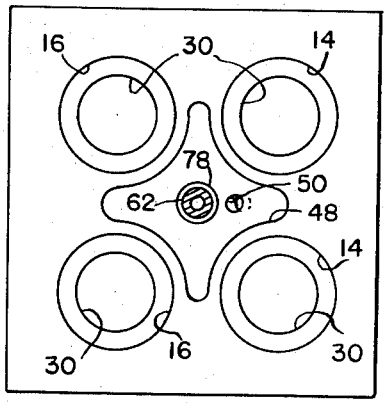
FIGURE 5 is a bottom plan view taken on the plane of line 5—5, FIGURE 3.
Figure 6:
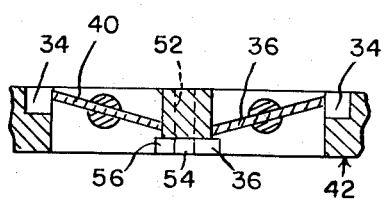
FIGURE 6 is a fragmentary cross-sectional view taken on the plane of line 6—6, FIGURE 4.

Referring now more particularly to FIGURE 3 the carburetor 10 is illustrated as provided with an air cleaner 46 which is mounted atop the carburetor. The body 12 of the carburetor is formed to provide a cavity 48 therein, this cavity being in communication with incoming air by means of a port or conduit 50. The throttle body 42 is provided with an opening 52 in alignment with the cavity 48, the lower portion of this opening being counterbored to provide an enlarged chamber 53. Air admitted to the chamber 53 by means subsequently to be described is conveyed to the primary and secondary induction passages 14 and 16 posterior to the throttle valves 36 and 40 through passages best illustrated at 53, 56 and 58 in FIGURE 4.

The carburetor body 12 is provided with a tubular projection 60 having an opening therethrough in alignment with the opening 52 extending through the throttle valve body 42. Movable in the opening through the projection 60 and the opening 52 is a center hold-down stud 62, the details of which will subsequently be described. The upper portion of the projection 60 is internally threaded as indicated at 64 and receives the lower externally threaded portion of an air cleaner attaching extension 68. The extension 68 includes a shoulder 70 engageable with the upper end of the internally threaded projection 60 and is provided with an axially extending opening 71 therethrough. The extension 68 cooperates with a nut 72 carried by an upper threaded portion 74 of the extension to mount the air cleaner 46 on an air cleaner support flange 75.

Figures 7, 8:
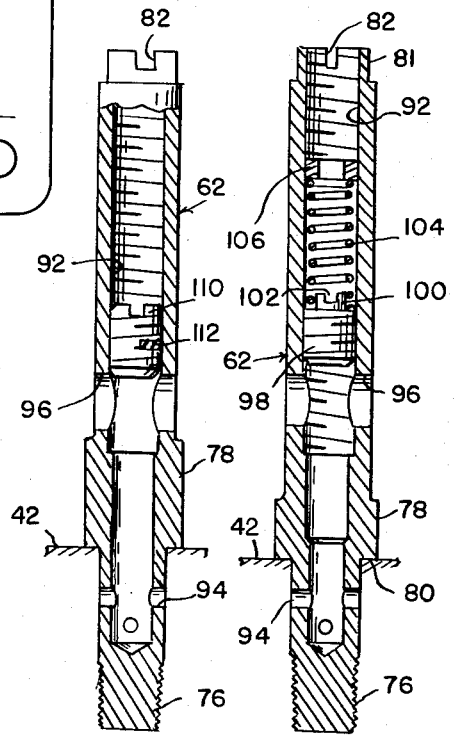
FIGURE 7 is an enlarged longitudinal sectional view of the carburetor hold-down and idle air adjustment valve.
FIGURE 8 is a longitudinal sectional view through a carburetor hold-down stud illustrating a second embodiment of the present invention.

Referring now more particularly to FIGURES 3 and 7, the details of the hold-down stud 62 and its coaction with the remaining structure of the carburetor will be described. The hold-down stud at its lower end is threaded as indicated at 76 and above the threaded portion it is provided with an integral radial flange 78 having a downwardly facing annular shoulder 80. The upper end of the stud is reduced as indicated at 81 and is provided with a construction by means of which the stud may be rotated, such for example as a screwdriver receiving recess 82. In the assembly the flange 78 is received in the chamber 48 of the carburetor body and bears against the upper surface of the throttle body 42. The engine manifold 44 is provided with a flat mounting surface 84 having a tapped opening 86 therein which receives the threaded lower end 76 of the stud. Spaced from the tapped recess 86 the manifold is provided with upwardly extending locating pins 88 adapted to be received in recesses 90 formed in the throttle body 42.

It will be recalled that the throttle body 42 is attached to the carburetor body 12 so that when the hold-down stud 62 is screwed into the opening 86 as illustrated in FIGURE 3, the entire carburetor assembly is located on and positively attached to the manifold. This of course also provides means by which the entire carburetor assembly may be removed from the manifold simply by unscrewing the stud 62.

The center hold-down stud 62 is provided with means for supplying idle air to the air intake passages and preferably, this idle air supply means is provided with adjustable valve means as best illustrated in FIGURE 7. It will be observed that in FIGURE 3, which is on a smaller scale, the center hold-down stud is not illustrated as provided with the adjustable valve means for controlling the supply of idle air although this adjustable valve means may be included if desired.

Referring now more particularly to FIGURE 7, which is on a considerably enlarged scale, the stud 62 is illustrated as having an internally threaded opening 92 extending downwardly from the upper end thereof. Below the flange 78 the opening 92 communicates with four radially extending passages 94 which communicate with the enlarged chamber 53 provided at the underside of the throttle body 42. At an intermediate portion of the stud 62 there are provided vertically elongated radially extending passages 96 affording communication between the interior of the chamber 48 in the carburetor body 12 and the longitudinally extending opening 92.

Located above the passages 96 is a threaded adjusting valve 98 the upper portion of which is provided with a reduced extension 100 having a screwdriver receiving slot 102 and which also forms a pilot for a compression spring 104 which operates to prevent movement of the adjusting valve 98 from vibration or other engine operating conditions. It will be apparent that a screwdriver may be inserted through the opening 92 into engagement with the slot 102 to effect a required adjustment of the valve 98 into partly closing relationship to the passages 96 as desired.

An annular externally threaded spring retainer 106 is provided in the interior threaded opening of the stud 62 to form a seat for engagement by the upper end of the spring 104. The spring retainer 106 is annular to permit passage of the screwdriver adjusting tool therethrough.

Referring again to FIGURE 3 it will be observed that the opening 71 through the air cleaner attachment extension 68 is illustrated as of approximately the same diameter as the reduced upper portion 81 of the stud. Accordingly, a screwdriver tool having a blade dimensioned to fit approximately within the opening 71 will engage the screwdriver slot 82 and thus the center hold-down stud may be released so that the entire carburetor assembly and air cleaner may be removed from the manifold as a unit. Alternatively, a second screwdriver tool having a smaller blade dimensioned to pass through the opening 92 in the stud, and more specifically through the annular spring retainer 106, may be inserted through the opening 71 to effect a required adjustment of idle air supply without disturbing the mounting of the carburetor or the air cleaner. Moreover, this adjustment when made is permanent since the action of the spring 104 acting between the valve 98 and the spring seat 106 is to prevent shifting of the valve from its adjusted position as a result of vibration or other causes.

Referring now to FIGURE 8 there is shown a modification of the invention in which the stud 62, instead of being provided with a spring 104 and spring retainer or seat 106, is provided with a special threaded adjusting valve 110. In this case the valve 110 may be of identical configuration with the valve 98 except that in a recess provided in one side thereof there is inserted a plastic friction plug 112 preferably formed of nylon. This plastic plug opposes a substantial frictional resistance to turning or adjustment of the valve 110 but not sufficient to prevent ready adjustment of the valve by the application of a screwdriver tool thereto. On the other hand, the friction supplied by the nylon plug is adequate to prevent accidental shifting of the valve from its adjusted position.

The drawings and the foregoing specification constitute a description of the improved fuel systems for internal combustion engines in such full, clear, concise and exact terms as to enable any person skilled in the art to practice the invention, the scope of which is indicated by the appended claims.

What we claim as our invention is:

1. A carburetor assembly having a vertical opening extending completely therethrough, the opening having a circumferential shoulder therein, a mounting stud having a locating flange engageable with said shoulder for determining the position of said stud within said opening, and a threaded lower end portion on said stud extending below said assembly for fastening engagement with a threaded recess on an engine manifold, the other end of said stud having a tool engageable formation thereon, said stud having an idle air passage extending from an intermediate portion thereof to the underside of said carburetor assembly.

2. A carburetor assembly having a vertical opening extending completely therethrough, the opening having a circumferential shoulder therein, a mounting stud having a locating flange engageable with said shoulder for determining the position of said stud within said opening, and a threaded lower end portion on said stud extending below said assembly for fastening engagement with a threaded recess on an engine manifold, the other end of said stud having a tool engageable formation thereon, said stud having an idle air passage extending from an intermediate portion thereof to the underside of said carburetor assembly, said stud being tubular and having an adjustable valve for said idle air passage threaded therein, said valve having a formation at its upper end for engagement with a valve adjusting tool inserted through the opening in said carburetor assembly from the top thereof and through the tubular stud.

3. A carburetor assembly having a vertical opening extending completely therethrough, the opening having a circumferential shoulder therein, a mounting stud having a locating flange engageable with said shoulder for determining the position of said stud within said opening, and a threaded lower end portion on said stud extending below said assembly for fastening engagement with a threaded recess on an engine manifold, the other end of said stud having a tool engageable formation thereon, said stud having an idle air passage extending from an intermediate portion thereof to the underside of said carburetor assembly, said stud being tubular and having an adjustable valve for said idle air passage threaded therein, said valve having a formation at its upper end for engagement with a valve adjusting tool inserted through the opening in said carburetor assembly from the top thereof and through the tubular stud, and friction means associated with said valve effective to frictionally lock said valve against accidental displacement.

4. An assembly as defined in claim 3 in which said friction means comprises an annular spring seat in said stud and a coil compression spring extending between said seat and said valve.

5. An assembly as defined in claim 3 in which said friction means comprises a plastic friction plug in the threaded portion of said valve for frictional engagement with mating threads at the interior of said stud.

6. A carburetor assembly comprising a body having air and fuel mixture passages therethrough and a central cavity in communication with atmosphere, and having aligned openings above and below said cavity, an attachment stud having a locating flange in said cavity engageable with the portion of the body surrounding the lower opening, the lower opening being enlarged at its lower end to form a chamber in communication with said air and fuel mixture passages, said stud having an idle air passage extending from said cavity to said chamber.

7. A carburetor assembly comprising a body having air and fuel mixture passages therethrough and a central cavity in communication with atmosphere, and having aligned openings above and below said cavity, an attachment stud having a locating flange in said cavity engageable with the portion of the body surrounding the lower opening, the lower opening being enlarged at its lower end to form a chamber in communication with said air and fuel mixture passages, said stud having an idle air passage extending from said cavity to said chamber, said stud extending into the opening above said cavity and having a tubular internally threaded upper portion, a threaded adjustable valve in said portion controlling idle air flow between said cavity and chamber, said valve having at its top a tool engaging formation to be engaged by a tool inserted into the upper end of the tubular upper portion.

8. A carburetor assembly comprising a body having air and fuel mixture passages therethrough and a central cavity in communication with atmosphere, and having aligned openings above and below said cavity, an attachment stud having a locating flange in said cavity engageable with the portion of the body surrounding the lower opening, the lower opening being enlarged at its lower end to form a chamber in communication with said air and fuel mixture passages, said stud having an idle air passage extending from said cavity to said chamber, said stud extending into the opening above said cavity and having a tubular internally threaded upper portion, a threaded adjustable valve in said portion controlling idle air flow between said cavity and chamber, said valve having at its top a tool engaging formation to be engaged by a tool inserted into the upper end of the tubular upper portion, and friction means associated with said valve to prevent accidental displacement of said valve.

9. A carburetor assembly comprising a body having air and fuel mixture passages therethrough and a central cavity in communication with atmosphere, and having aligned openings above and below said cavity, an attachment stud having a locating flange in said cavity engageable with the portion of the body surrounding the lower opening, the lower opening being enlarged at its lower end to form a chamber in communication with said air and fuel mixture passages, said stud having an idle air passage extending from said cavity to said chamber, said stud extending into the opening above said cavity and having a tubular internally threaded upper portion, a threaded adjustable valve in said portion controlling idle air flow between said cavity and chamber, said valve having at its top a tool engaging formation to be engaged by a tool inserted into the upper end of the tubular upper portion, and friction means associated with said valve to prevent accidental displacement of said valve, said friction means comprising an annular spring seat in said stud and a coil compression spring extending between said seat and said valve.

10. A carburetor assembly comprising a body having air and fuel mixture passages therethrough and a central cavity in communication with atmosphere, and having aligned openings above and below said cavity, an attachment stud having a locating flange in said cavity engageable wih the portion of the body surrounding the lower opening, the lower opening being enlarged at its lower end to form a chamber in communication with said air and fuel mixture passages, said stud having an idle air passage extending from said cavity to said chamber, said stud extending into the opening above said cavity and having a tubular internally threaded upper portion, a threaded adjustable valve in said portion controlling idle air flow between said cavity and chamber, said valve having at its top a tool engaging formation to be engaged by a tool inserted into the upper end of the tubular upper portion, and friction means associated with said valve to prevent accidental displacement of said valve, said friction means comprising a plastic friction plug in the threaded portion of said valve for frictional engagement with mating threads at the interior of said stud.

11. A carburetor assembly for attachment to an engine manifold having a tapped recess, said assembly comprising a throttle body having a vertical opening therethrough adapted to be supported on said manifold with the vertical opening in alignment with the tapped recess, the top surface of said throttle body providing a circumferential shoulder which is concentric with said vertical opening, a main body attached to said throttle body having air and fuel mixture passages extending therethrough, said main body having a cavity at its underside in alignment with the opening through said throttle body and an upward tubular extension also in alignment with the opening in said throttle body, a passage connecting said cavity to atmosphere, a stud having a locating flange in said cavity engaging the circumferential shoulder of said throttle body for determining the position of said stud within said opening, and a threaded lower end on said stud adapted to be threadedly received in the tapped recess in said manifold, the upper end of said stud being shaped for engagement by a tool inserted through said tubular extension, said stud having an idle air passage extending from an intermediate portion in said cavity to the vertical opening in said throttle body.

12. A carburetor assembly for attachment to an engine manifold having a tapped recess and locating pins spaced from said recess, said assembly comprising a throttle body having a vertical opening therethrough adapted to be supported on said manifold with the vertical opening in alignment with the tapped recess, the top surface of said throttle body providing a circumferential shoulder which is concentric with said vertical opening, a main body attached to said throttle body having air and fuel mixture passages extending therethrough, said main body having a cavity at its underside in alignment with the opening through said throttle body and an upward tubular extension also in alignment with the opening in said throttle body, a passage connecting said cavity to atmosphere, a stud having a locating flange in said cavity engaging the circumferential shoulder of said throttle body for determining the position of said stud within said opening, and a threaded lower end on said stud adapted to be threadedly received in the tapped recess in said manifold, the upper end of said stud being shaped for engagement by a tool inserted through said tubular extension, said throttle body having recesses for receiving said pins to locate said throttle body on the manifold.

13. A carburetor assembly for attachment to an engine manifold having a tapped recess, said assembly comprising a throttle body having a vertical opening therethrough adapted to be supported on said manifold with the vertical opening in alignment with the tapped recess, the top surface of said throttle body providing a circumferential shoulder which is concentric with said vertical opening, a main body attached to said throttle body having air and fuel mixture passages extending therethrough, said main body having a cavity at its underside in alignment with the opening through said throttle body and an upward tubular extension also in alignment with the opening in said throttle body, a passage connecting said cavity to atmosphere, a stud having a locating flange in said cavity engaging the circumferential shoulder of said throttle body for determining the position of said stud within said opening, and a threaded lower end on said stud adapted to be threadedly received in the tapped recess in said manifold, the upper end of said stud being shaped for engagement by a tool inserted through said tubular extension, an air cleaner on said main body, a tubular element threaded to said tubular extension and extending through a central opening in said air cleaner, and means on said tubular element to clamp said air cleaner to said main body, the opening through said tubular element being aligned with the threaded opening in said tubular extension to afford access therethrough to said stud.

14. A carburetor assembly for mounting on a manifold having a threaded recess therein, comprising a body having a central cavity in communication with atmosphere and vertically aligned openings above and below said cavity, a circumferential shoulder in said body at the bottom of said cavity, a vertical mounting stud received in said openings and having a threaded lower end extending below said assembly for fastening engagement with the threaded recess in the manifold, and flange means on said stud engaging said shoulder to clamp said assembly to the manifold, the upper end of said stud being shaped for engagement with a tool inserted into the top of the opening above said cavity.

15. A carburetor assembly for mounting on a manifold having a threaded recess therein, comprising a body having a central cavity in communication with atmosphere and vertically aligned openings above and below said cavity, a circumferential shoulder in said body at the bottom of said cavity, a vertical mounting stud received in said openings and having a threaded lower end extending below said assembly for fastening engagement with the threaded recess in the manifold, flange means on said stud engaging said shoulder to clamp said assembly to the manifold, the upper end of said stud being shaped for engagement with a tool inserted into the top of the opening above said cavity, an air cleaner on said body, a tubular element having its lower end coupled to said body in alignment with the opening therein above said cavity, said element extending through said air cleaner, and fastening means on said element engaging said air cleaner to clamp it against said carburetor body.

16. A carburetor assembly for mounting on a manifold having a threaded recess therein, comprising a body having a central cavity in communication with atmosphere and vertically aligned openings above and below said cavity, a circumferential shoulder in said body at the bottom of said cavity, a vertical mounting stud received in said openings and having a threaded lower end extending below said assembly for fastening engagement with the threaded recess in the manifold, flange means on said stud engaging said shoulder to clamp said assembly to the manifold, the upper end of said stud being shaped for engagement with a tool inserted into the top of the opening above said cavity, an air cleaner on said body, a tubular element having its lower end threaded to said body in alignment with the opening therein above said cavity, said element extending through said air cleaner, and fastening means on said element engaging said air cleaner to clamp it against said carburetor body, said stud having a passage therethrough extending from said cavity to the under side of said body to provide a flow of idle air to the manifold.

17. A carburetor assembly for mounting on a manifold having a threaded recess therein, comprising a body having a central cavity in communication with atmosphere and vertically aligned openings above and below said cavity, a circumferential shoulder in said body at the bottom of said cavity, a vertical mounting stud received in said openings and having a threaded lower end extending below said assembly for fastening engagement with the threaded recess in the manifold, flange means on said stud engaging said shoulder to clamp said assembly to the manifold, the upper end of said stud being shaped for engagement with a tool inserted into the top of the opening above said cavity, an air cleaner on said body, a tubular element having its lower end threaded to said body in alignment with the opening therein above said cavity, said element extending through said air cleaner, and fastening means on said element engaging said air cleaner to clamp it against said carburetor body, said stud having a passage therethrough extending from said cavity to the underside of said body to provide a flow of idle air to the manifold, the upper portion of said stud being tubular and internally threaded, a threaded valve in said stud adjustable to control idle air flow, said valve being accessible for adjustment by a tool inserted through said tubular element and the tubular portion of said stud without removal of said air cleaner from said carburetor assembly.

18. A carburetor assembly for attachment to an engine manifold body having a tapped recess comprising a throttle body having a vertical opening therethrough adapted to be supported on said manifold body with the vertical opening in alignment with the tapped recess, the top surface of said throttle body providing a circumferential shoulder which is concentric with said vertical opening, a main body attached to said throttle body having air and fuel mixture passages extending therethrough, said main body having a cavity at its underside in alignment with the opening through said throttle body and an upward tubular extension also in alignment with the opening in said throttle body, a passage connecting said cavity to atmosphere, a stud having a locating flange in said cavity engaging the circumferential shoulder of said throttle body for determining the position of said stud within said opening, a threaded lower end on said stud adapted to be threadedly received in the tapped recess in said manifold body, the upper end of said stud being shaped for engagement by a tool inserted through said tubular extension, and a plurality of pins provided on one of said throttle body or said manifold body with the remaining body having recesses for receiving said pins to locate said throttle body on the manifold body.

19. A carburetor assembly for attachment to an engine manifold having a tapped recess, said assembly comprising a throttle body having a vertical opening therethrough adapted to be supported on said manifold with the vertical opening in alignment with the tapped recess, a main body attached to said throttle body having air and fuel mixture passages extending therethrough, said body having a cavity at its underside in alignment with the opening through said throttle body and an upward tubular extension also in alignment with the opening in said throttle body, a passage connecting said cavity to atmosphere, a stud having a locating flange in said cavity engaging the upper surface of said throttle body for determining the position of said stud within said opening, an idle air passage in said stud, a threaded lower end on said stud adapted to be threadedly received in the tapped recess in said manifold, a tubular internally threaded upper portion on said stud, a threaded adjustable valve in said portion for controlling idle air flow through said idle air passage, the upper ends of each of said stud and valve being shaped for engagement by a tool inserted through said tubular extension, an air cleaner on said main body, a tubular element threaded to said tubular extension and extending through a central opening in said air cleaner, and means on said tubular element to clamp said air cleaner to said main body, the opening through said tubular element being aligned with the threaded opening in said tubular extension to afford access therethrough to said stud and valve.

20. A carburetor assembly having a vertical opening extending completely therethrough, the opening having a circumferential shoulder therein, a mounting stud having a locating flange engageable with said shoulder for determining the position of said stud within said opening, and a threaded lower end portion on said stud extending below said assembly for fastening engagement with a threaded recess on an engine manifold, said stud having an idle air passage extending from an intermediate portion thereof to the underside of said carburetor assembly.

21. A carburetor assembly having a vertical opening extending completely therethrough, the opening having a circumferential shoulder therein, a mounting stud having a locating flange engageable with said shoulder for determining the position of said stud within said opening, and a threaded lower end portion on said stud extending below said assembly for fastening engagement with a threaded recess on an engine manifold, said stud having an idle air passage extending from an intermediate portion thereof to the underside of said carburetor assembly, said stud being tubular and having an adjustable valve for said idle air passage threaded therein.

22. A carburetor assembly having a vertical opening extending completely therethrough, the opening having a circumferential shoulder therein, an elongated tubular mounting stud open at one end and closed at the other end, a locating flange on said stud near the closed end thereof and engageable with said shoulder for determining the position of said stud within said opening, said closed end being threaded and extending below said assembly for fastening engagement with a threaded recess on a support, and radially extending upper and lower ports in the wall of said stud on opposite sides of said locating flange which communicate with the interior of said stud to form an idle air passage.

23. A carburetor assembly having a vertical opening extending completely therethrough, the opening having a circumferential shoulder therein, an elongated tubular mounting stud open at one end and closed at the other end, a locating flange on said stud near the closed end thereof and engageable with said shoulder for determining the position of said stud within said opening, said closed end being threaded and extending below said assembly for fastening engagement with a threaded recess on a support, and radially extending upper and lower ports in the wall of said stud on opposite sides of said locating flange which communicate with the interior of said stud to form an idle air passage, said stud having an adjustable valve therein threaded to a portion of the stud immediately above the aforesaid upper port.

References Cited in the file of this patent

UNITED STATES PATENTS

| | | |
|---|---|---|
| 2,060,747 | Rayfield | Nov. 10, 1936 |
| 2,296,697 | Ball | Sept. 22, 1942 |
| 2,618,474 | Agar | Nov. 18, 1952 |